United States Patent
Lemieux et al.

(10) Patent No.: US 7,505,683 B1
(45) Date of Patent: Mar. 17, 2009

(54) METHOD, SYSTEM AND STORAGE MEDIUM FOR MONITORING POWER CONTROL LOOPS IN OPTICAL COMMUNICATION NETWORKS

(75) Inventors: Jean-Francois Lemieux, Montreal (CA); Jocelyn Lefrancois, San Jose, CA (US); Etienne McCullough, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 650 days.

(21) Appl. No.: 10/373,632

(22) Filed: Feb. 25, 2003

(51) Int. Cl.
*H01S 3/00* (2006.01)
*H04B 10/08* (2006.01)

(52) U.S. Cl. .............. 398/4; 398/5; 398/94; 398/197; 398/38; 379/395.01

(58) Field of Classification Search .............. 398/38, 398/94, 197; 379/395.01
See application file for complete search history.

(56) References Cited

U.S. PATENT DOCUMENTS

| | | | |
|---|---|---|---|
| 5,825,516 A * | 10/1998 | Walsh ..................... | 398/40 |
| 6,304,347 B1 * | 10/2001 | Beine et al. ............. | 398/38 |
| 6,690,506 B2 * | 2/2004 | Zahnley et al. ......... | 359/337.11 |
| 6,744,964 B1 * | 6/2004 | Vittal ..................... | 385/140 |
| 2003/0016411 A1 * | 1/2003 | Zhou et al. ............. | 359/110 |
| 2004/0086274 A1 * | 5/2004 | Wan et al. ............... | 398/9 |
| 2004/0100684 A1 * | 5/2004 | Jones et al. ............. | 359/337.11 |

* cited by examiner

*Primary Examiner*—Kenneth N Vanderpuye
*Assistant Examiner*—Danny W Leung
(74) *Attorney, Agent, or Firm*—Clements Bernard Miller; Christopher L. Bernard; Tyler S. Brown

(57) ABSTRACT

A method, system and storage medium for monitoring power control loops in an optical communication network. The method includes polling network elements to obtain power management information for the network elements. A set of power management rules is selected based on the power management information along with network configuration, channel types, etc. The power management rules are applied to determine the validity of open and closed power control loop in the network elements.

11 Claims, 8 Drawing Sheets

| Normal | | | | | | | | | | | |
|---|---|---|---|---|---|---|---|---|---|---|---|
| 2081-NE1 | 1 | 1 WPSW-Prot | W | IN_RANGE | OPEN | -4.6 | -7.4 | 8 | 0.7 | 0.0 | 0.7 |
| | | | | | | 0.0 | -7.4 | 0 | 0.0 | 20.0 | 20.0 |
| | | | | | | 1.5 | 5.2 | 3 | 0.7 | 1.5 | 0.8 |
| | | | | | | -2.6 | -4 | 8 | 0.0 | 1.0 | 1.0 |
| | | | | | | -0.8 | -1.9 | 1 | 0.0 | 0.0 | 0.7 |
| | | | | | | 1.5 | -1.2 | 1 | 0.0 | 0.5 | 0.5 |
| | | | | | | 3.3 | -8.5 | 1 | 3.2 | 4.5 | 1.3 |
| 2081-NE1 | 1 | 23 WPSE-Prot | E | IN_RANGE | OPEN | 0.0 | -8.5 | 0 | 0.0 | 0.0 | 20 |
| | | | | | | 1.5 | -2.1 | 3 | 1.2 | 1.5 | 0.3 |
| | | | | | | 1.5 | 20 | 2 | -0.7 | 0.0 | 0.7 |
| 2082-NE2 | 1 | 1 WPSW-Prot | W | IN_RANGE | OPEN | -4.5 | 10.5 | 1 | 3.6 | 3.0 | -0.6 |
| | | | | | | -2.7 | 10.5 | 0 | 5.9 | 20.0 | 14.1 |
| | | | | | | 1.5 | 6.3 | 1 | 1.3 | 1.5 | 0.2 |
| | | | | | | 0.9 | -1.9 | 1 | 0.0 | 0.0 | 0.0 |
| | | | | | | 1.0 | 0.2 | 1 | 0.0 | 0.0 | 0.0 |
| | | | | | | 1.5 | -22 | 1 | 2.9 | 3.0 | 0.1 |
| 2082-NE2 | 1 | 23 WPSE-Prot | E | IN_RANGE | OPEN | -5.9 | -9.4 | 1 | 1.2 | 1.5 | 0.3 |
| | | | | | | -5.1 | -9.4 | 0 | 2.0 | 20.0 | 18.0 |

*FIG. 4*

METHOD, SYSTEM AND STORAGE MEDIUM FOR MONITORING POWER CONTROL LOOPS IN OPTICAL COMMUNICATION NETWORKS

BACKGROUND OF THE INVENTION

1. Field of Invention

The invention relates generally to power management in optical communication networks and in particular to determining the validity of power control loops in an optical communication network.

2. Description of Related Art

Optical communication networks often include optical power management components to make sure that the optical signals are properly transported from one network element to the other. Power management is often done by manually configuring network elements which has a number of drawbacks. First, manually configuring each network element is prone to errors. Secondly, each network element being different, their configuration must be customized which requires time and resources. Thirdly, these manually configured systems cannot easily support optical protection switching that changes wavelength routing, power levels and number of wavelengths at different locations in the network. Finally, network upgrades (e.g., network element addition, hardware addition, new services deployment) can be costly and time consuming since all the network elements in the network might need to be reconfigured.

BRIEF DESCRIPTION OF THE DRAWINGS

Embodiments of the present invention will become more fully understood from the detailed description given hereinbelow and the accompanying drawings which are given by way of illustration only, and thus are not limitative of the present invention, and wherein:

FIG. 4 is an exemplary user interface depicting power control loop status; and

DETAILED DESCRIPTION OF INVENTION

The following detailed description of embodiments of the invention refers to the accompanying drawings. The same reference numbers in different drawings identify the same or similar elements. Also, the following detailed description does not limit the invention. Instead, the scope of the invention is defined by the appended claims and equivalents thereof.

The invention may be used in a variety of communications networks, including electrical and optical networks, and combination electrical/optical networks. The expression "communicates" as used herein refers to any connection, coupling, link or the like by which signals carried by one system element are imparted to the "communicating" element. Such "communicating" devices are not necessarily directly connected to one another and may be separated by intermediate components or devices. Likewise, the expressions "connected" and "coupled" as used herein are relative terms and do not require a direct physical connection.

Figure 1:
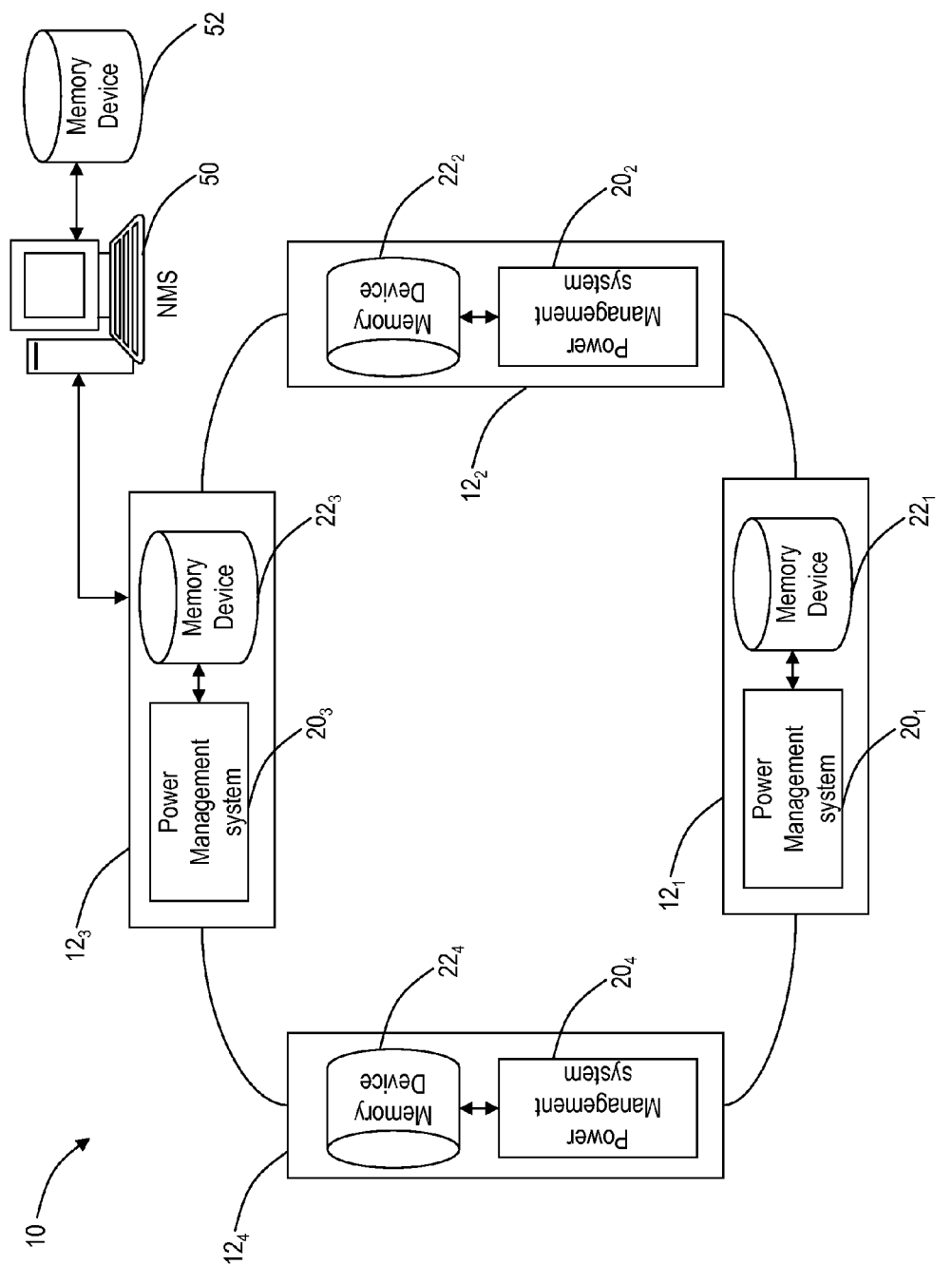
FIG. 1 is a block diagram of a communication network in an exemplary embodiment of the invention.

FIG. 1 is a block diagram of an exemplary optical communication network 10 in an embodiment of the invention. The network 10 includes a number of network elements 12 arranged in a ring configuration. It is understood that the network may have a variety of architectures and the invention is not limited to ring networks. Exemplary architectures include point-to-point, linear add/drop multiplexers (ADM), Unidirectional Path Switched Ring (UPSR), Bi-directional Line-Switched Ring (BLSR) and mesh. Signals may be transmitted along the communication network 10 using a variety of techniques include wavelength division multiplexing (WDM), time division multiplexing (TDM), etc.

Each network element 12 includes a power management system 20 and a memory device 22. The power management system 20 controls power of signals carried by the network element 12 as described in further detail with reference to FIG. 2. The memory device 22 stores power management information concerning the network 10 and the network element 12 used to determine an appropriate power control mode. Such power management information may include the network type (e.g., linear, ring), types of channels (protected or unprotected), number of channels, expected power, actual power at multiple locations, types of components in the network element, operation mode (e.g., closed loop or open loop), etc. This power management information is used by the power management system 20 to control power.

Figure 2:
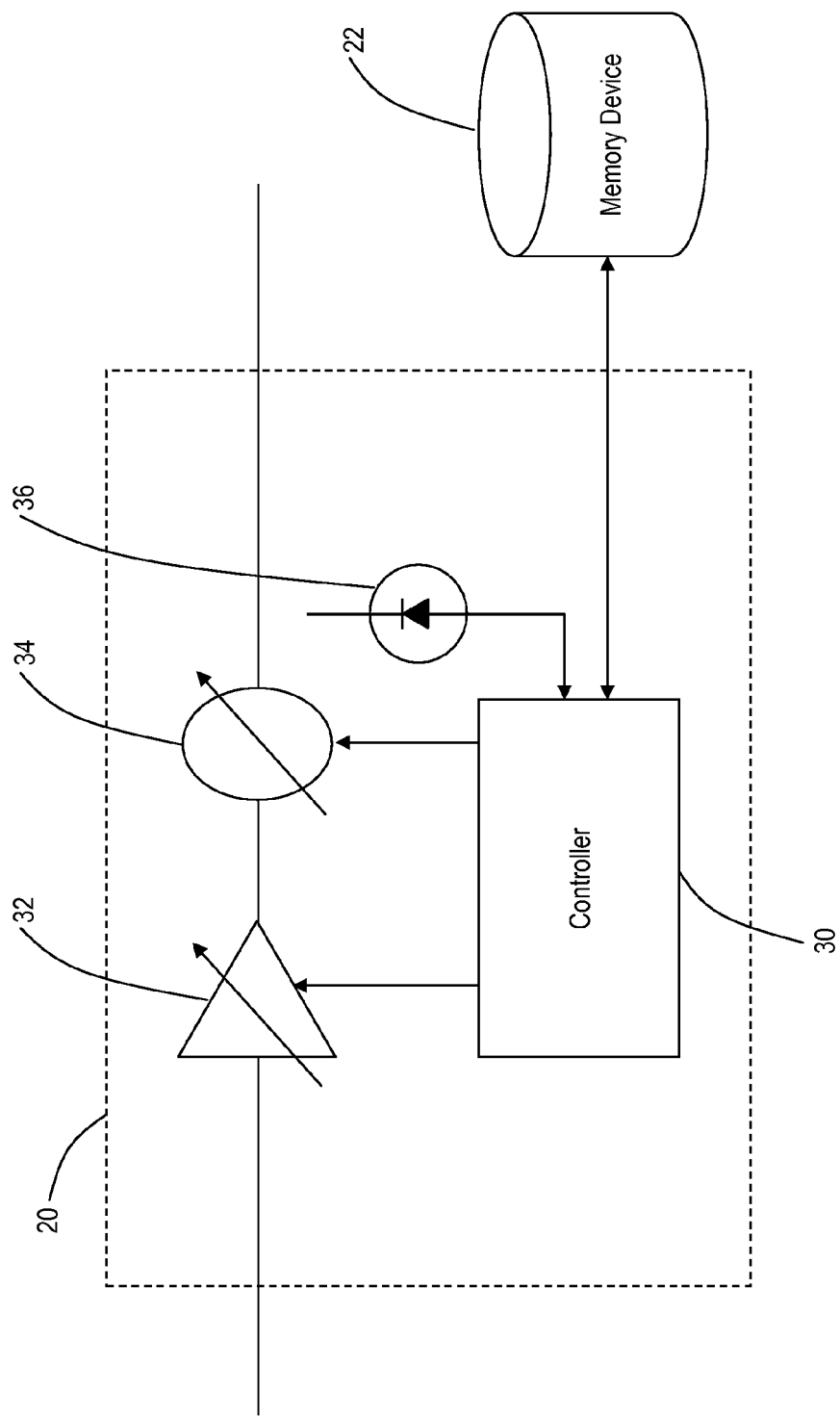
FIG. 2 is a block diagram of an exemplary power management system.

FIG. 2 is a block diagram of an exemplary power management system 20. The power management system 20 includes a controller 30 which implements a power management application. Controller 30 may be implemented by one or more general purpose microprocessors. Power adjustment devices such as variable gain amplifier 32 and variable optical attenuator (VOA) 34 are controlled by controller 30. Although both an amplifier 32 and VOA 34 are shown, it is understood that only one or more than 2 devices may be used to control power. A power monitoring device 36 such as a diode measures optical power after the VOA 34 and provides a measured power signal to the controller 30. Multiple power monitoring devices may be employed (e.g., before amplifier, before VOA, etc.).

The power management system 20 may operate in a open loop mode or closed loop mode. In open loop mode, the controller 30 sets gain and attenuation levels for the amplifier 32 and VOA 34, and then operates without adjusting the gain or attenuation. In closed loop mode, the controller 30 monitors the power signal from power monitoring device 36 and adjusts gain and/or attenuation to maintain a desired power level. The controller 30 also periodically stores information to memory device 22 such as the measured power from diode 36, gain setting for amplifier 32, attenuation setting for VOA 34, etc.

The network management system (NMS) 50 communicates with each network element 12 to retrieve power management information. The collected power management information may be stored in memory device 52 associated with NMS 50. The NMS 50 may be implemented using a general purpose computer executing a program to perform the processes described herein. Alternatively, the NMS 50 may be implemented through a craft terminal used by field technicians for network diagnosis. The NMS 50 may communicate with each network element 12 over a separate control network (e.g., an overlay IP network) or a channel on the communication network (e.g., service channel). Existing command protocols (e.g. Telnet, TL1) may be used to provide the communication.

In operation, the NMS 50 monitors each network element 12, retrieves power management information from memory devices 22 and executes a power control loop analysis. The power control loop analysis determines whether each power management system 20 is operating appropriately in view of the power management information. The NMS 50 applies a number of power control rules and displays the status and validity of each power control loop in each network element 12. This facilitates troubleshooting and correcting power control errors in communication network 10.

Figure 3:
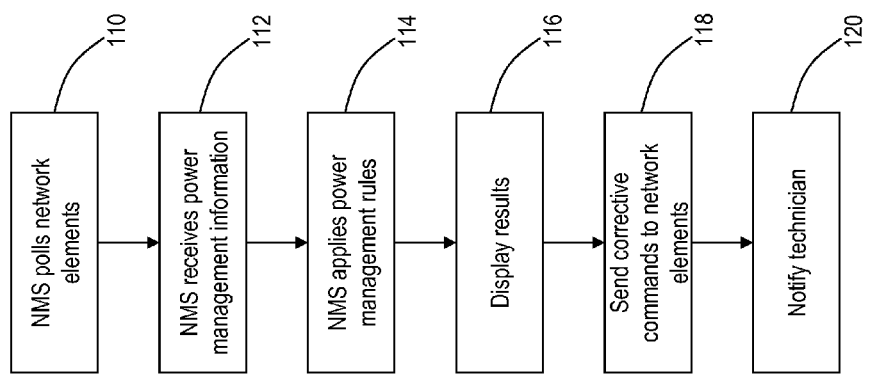
FIG. 3 is a flowchart of an exemplary process for monitoring power control loop status.
Figure 5A:
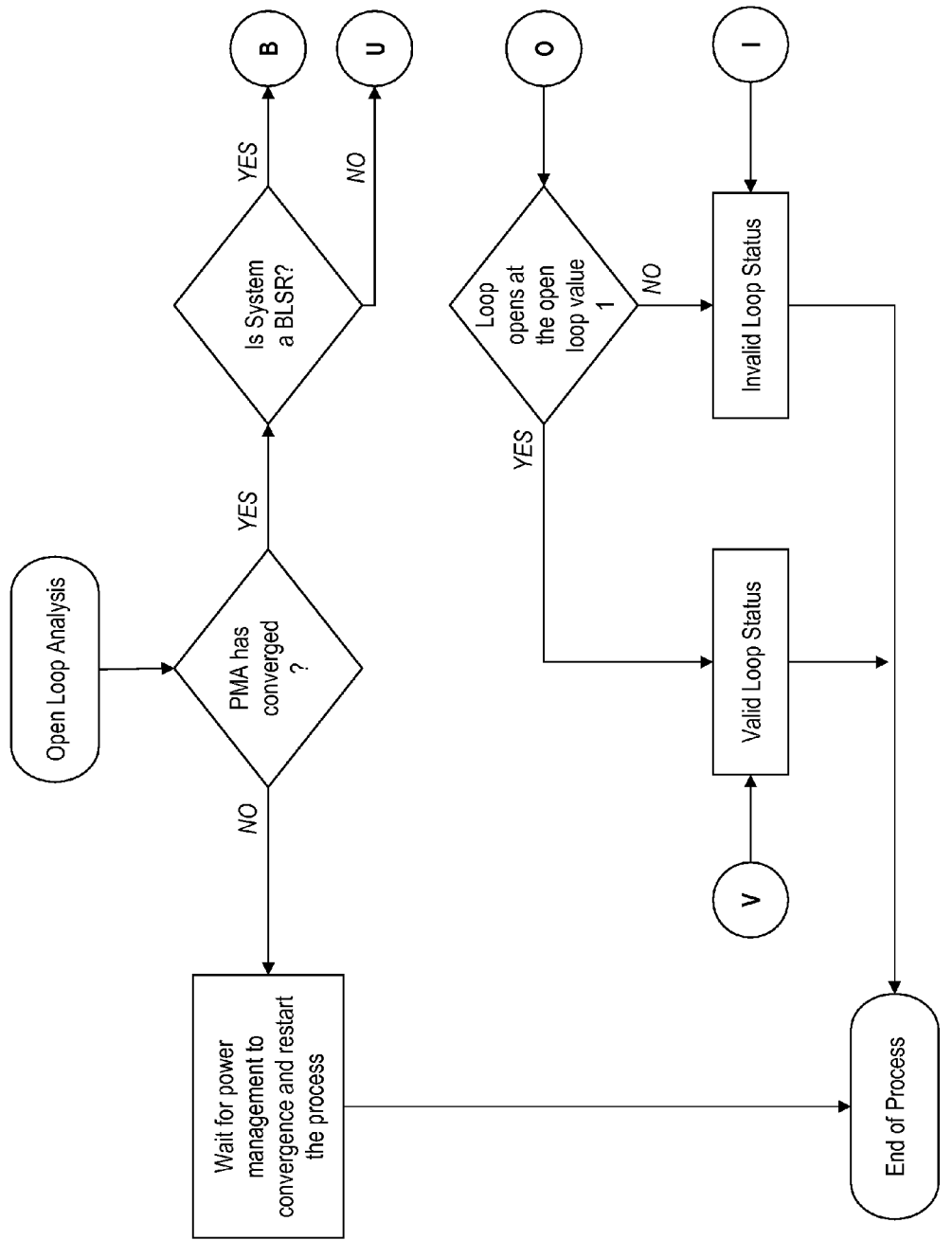
FIGS. 5A-5D are a flowchart of an exemplary process for determining the status of power control loops in open loop mode.
Figure 5B:
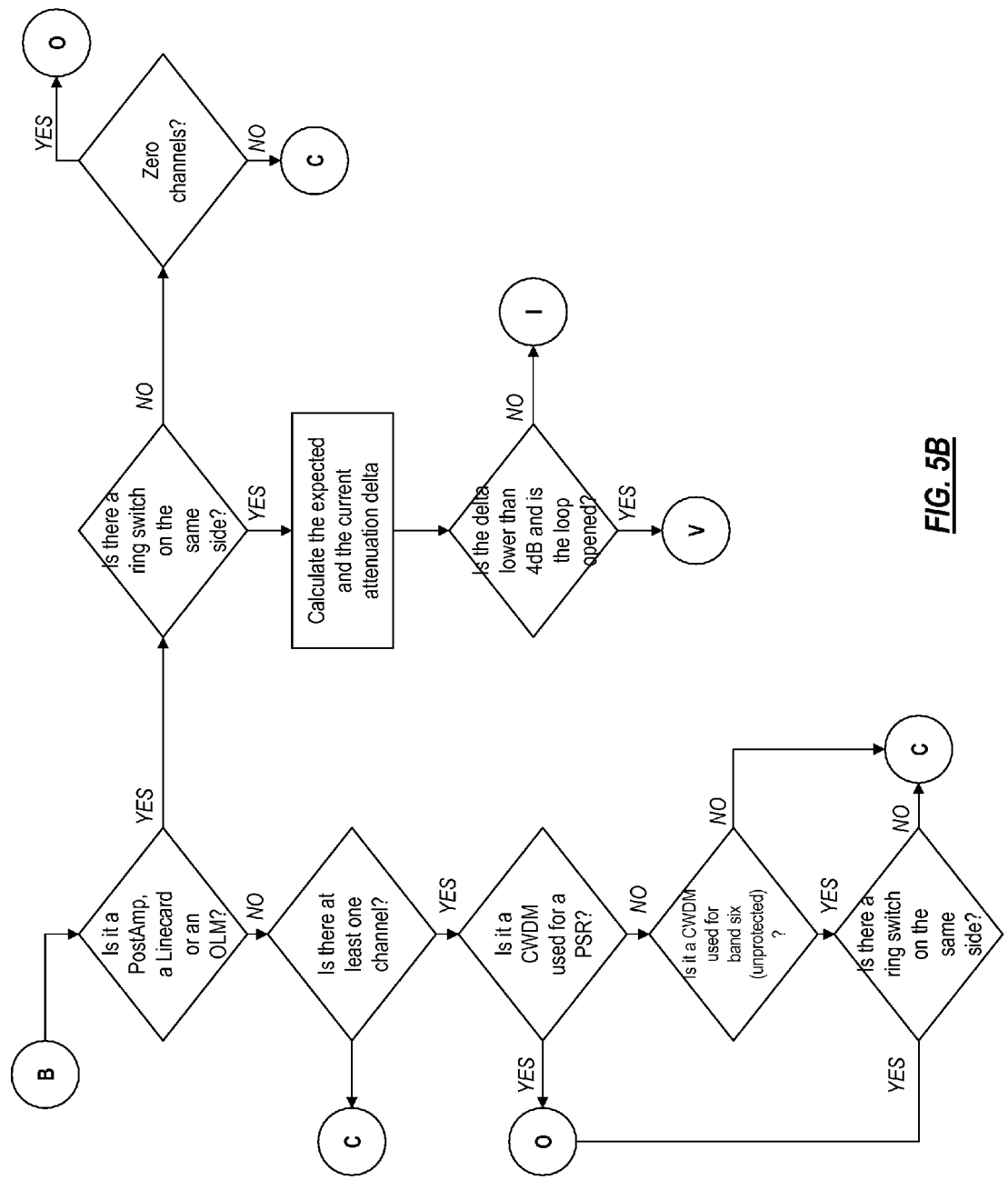
Figure 5C:
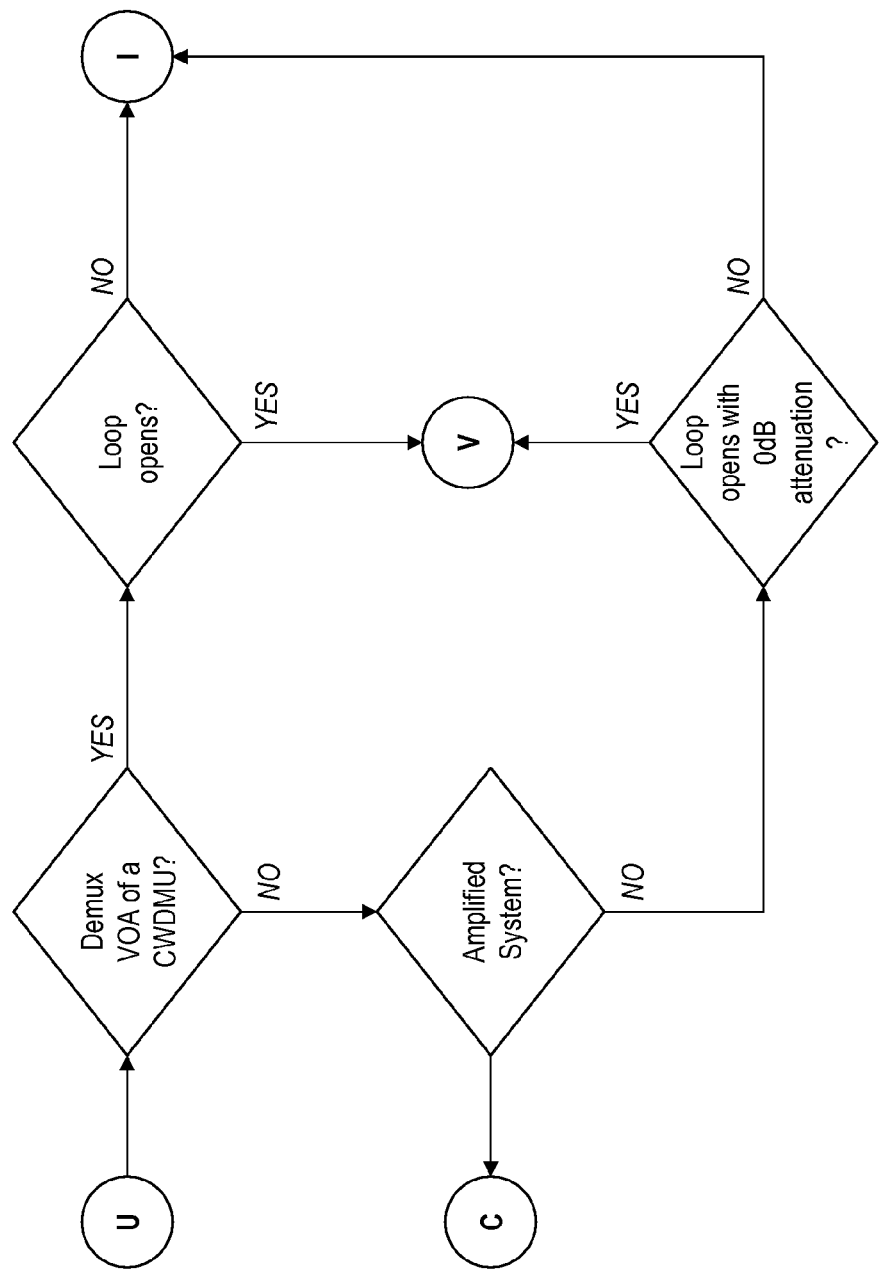
Figure 5D:
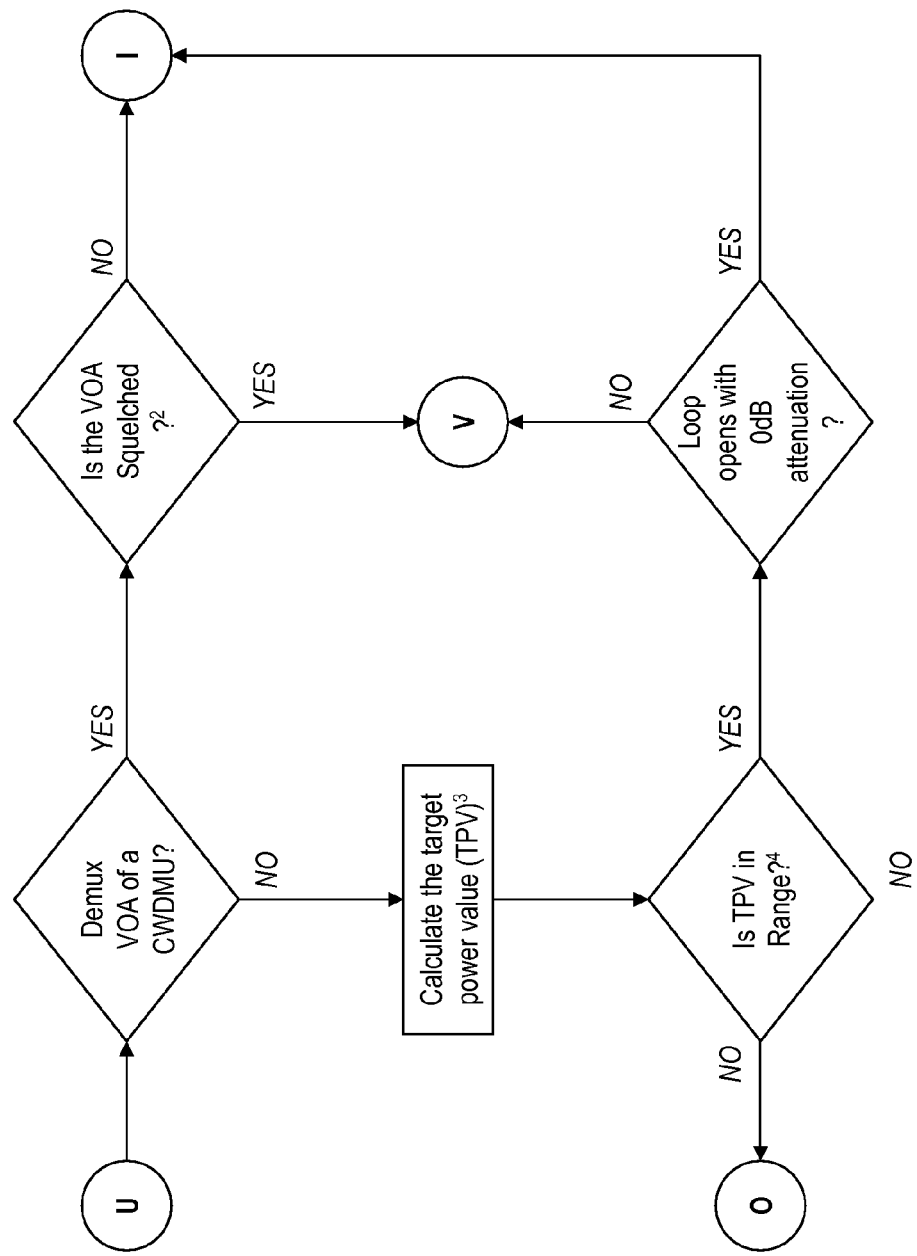

FIG. 3 is a high-level flowchart of a process of monitoring power control loops executed by the NMS 50. The process begins at step 110, where the NMS 50 polls the network elements 12 for power management information. Such power management information includes network configuration (e.g., ring, linear, mesh) operating mode (e.g., closed loop, open loop), measured power at receiver, measured power at power monitoring device 36, number of channels, types of channels (e.g., protected, non-protected), expected power, type of components (e.g., fast response VOA, slow response VOA), etc. Some power management information (e.g., network configuration, number of channels, type of channels) may already be stored in memory device 52 associated with NMS 50 and not retrieved from the network elements 12.

At step 112, the NMS receives the power management information and applies power management rules at step 114. An example of application of power management rules is shown in FIGS. 5A-5D. In general, the NMS applies power management rules to determine whether the power management systems 20 are operating in the proper mode (e.g., open loop or closed loop) given the power management information.

The result of application of the power management rules is displayed on the NMS 50 at step 116. FIG. 4 shows an exemplary user interface providing the result of the power management analysis. The user interface includes a column of network element identifiers 60. Control loop status indicators 62 present the mode of the power control loop at each network element (e.g., open, closed) and its status. The status is presented graphically by presenting the word open of closed in different colors to represent valid (e.g., green) or invalid (e.g., red) status. It is understood that other techniques may be used to convey status. In the example shown in FIG. 4, only control loops in open mode are shown as valid or invalid. It is understood that closed control loop status may be displayed in a similar fashion.

If at step 114, one or more power management systems 20 are found to have invalid status, corrective commands may be issued from the NMS 50 to the power management system 20 at step 118. Such commands may be directed to controller 30 to initiate some action such as enter closed loop mode, change set point for the gain or attenuation, etc.

If corrective commands from the NMS 50 to the power management system 20 cannot correct the fault, then a technician may be notified of the invalid power control loop at step 120. The technician may then physically service the network element, replacing failed components, loading new software, etc.

FIGS. 5A-5D show an exemplary application of power management rules directed to determining validity of power management systems operating in open loop mode. It is understood that similar rules may be applied for determining validity of power management systems operating in closed loop mode. The legends used in FIGS. 5A-5D include B for BLSR, C for common flow, I for invalid loop status, O for open loop value, U for UPSR and V for valid loop status.

The process of FIGS. 5A-5D detects valid open loops and invalid open loops for a variety of network architectures. Examples of valid open loops in Point to Point, Linear ADM and UPSR networks include the expected power being greater than a measurement threshold (e.g., dynamic range of the power monitoring device 36). In this scenario, the power monitoring device 36 will saturate and not provide an accurate reading of the power. This will cause the controller to adjust the amplifier 32 and/or VOA 34 to incorrect values. Thus, open loop mode is valid in this scenario.

Another valid open loop condition is when there are no optical circuits going through the VOA (i.e., the network element is configured in such a way that there should not be any circuits going through this VOA). There will be no signal from power monitoring device 36 making closed loop mode unavailable. In this mode, the controller 30 then sets the power control loop to open mode and the VOA 34 attenuation to the highest value to prevent propagation of any amplifier 32 Amplified Spontaneous Emission (ASE).

Another valid open loop condition occurs in the process of an upgrade (e.g. network element addition, circuit addition, etc.). During an upgrade, power values can fluctuate causing closed loop power control loops to overcompensate for power changes. The management of the power control loops depends on the hardware and software implementation. In one implementation, once the system is ready to move to the new configuration, power control loops are set to closed mode one by one until the upgrade process is completed. This reduces the possibility of resonance in a ring configuration (uncontrolled power fluctuations).

Valid open loops in BLSR and mesh networks include the expected power exceeding the dynamic range of the power monitoring device and system upgrades described above with reference to Point to Point, Linear ADM and UPSR networks. Given that BLSR and mesh networks provide protection switching, the case of no channels passing though a network element is handled differently. If a protection path is activated, the number of channels through a network element can change rapidly. Thus, the types of components in the power management system 20 dictate whether an open loop or closed loop mode is preferred.

Depending on the type of implementation (hardware and software), all the power control loops in the network may not be treated the same way when there are no channels going through it. A slow VOA (e.g. step-motor VOA) might not be set to its highest attenuation in normal conditions even though there are no channels going through it (but there are channels in specific switching conditions). The power control loop is set to open and the attenuation is set to an expected value. Therefore, during the protection switching, the slow VOA does not need to change its attenuation. This process insures that the restoration time does not depend on the limitations of a slow VOA. After the switching process is completed, the power control loop can be closed and the optical power maintained at a new expected value (calculated value for this specific switching condition).

Nevertheless, it is still advantageous in a BLSR or optical mesh network to have fast VOAs or a combination of slow and fast VOAs. Fast VOAs can be set to the highest attenuation in normal condition when there are no channels going through it and therefore prevent propagation of unwanted ASE. During the protection switch, if channels are redirected through the VOA, the controller 30 quickly sets the VOA 34 to the expected attenuation (corresponding to this protection switching state) to insure channels restoration below 50 ms. If the ASE is properly attenuated by a fast VOA in normal condition, other VOAs in the configuration could be slow VOAs and be kept at the expected attenuation (in normal state) even when no channels are going through it.

The process of FIGS. 5A-5D also determines non-valid open loop modes. These can be caused by a hardware failure, a response of the power management system 20 to an unexpected change in the network, a response of the power management system 20 to a circuit pack level alarm, a response of the power management system 20 to a system level alarm, a software defect in the power management system 20 itself, etc. These non-valid open loops deteriorate the ability of the power management system 20 to control power levels and fluctuations in the system, channel power uniformity at the optical amplifiers, receivers' received power and appropriate switching time in the case of a BLSR or an optical mesh network.

Exemplary non-valid open loops include a loss of signal (LOS) at a receiver of a network element. This LOS might be caused by any unexpected loss, mis-fibered connections, damaged components, etc. When there is a LOS at a network element, the controller 30 receives no signal from the power monitoring device 36 and suspends its gain and/or attenuation control. Since there is no optical power to measure, the power management system 20 cannot operate in closed loop mode. Some power management system 20 may set multiple control loops to open mode, even though not associated with the power monitoring device 36 providing no power signal.

A power level change larger than a predetermined value detected by the power monitoring device 36 causes the power management system 20 to suspend the attenuation control and enter open loop mode. These power fluctuations can be caused by an unstable transmitter, an unstable optical amplifier, broken fiber and defective components, etc.

The power management system 20 itself can be defective. For example, a VOA 34 step-motor may be inoperable, the power monitoring device 36 may have been damaged by high optical power, etc. Such failures would not allow the control loop to operate in close loop mode. Further, there may be a software defect in the power management system 20 that prevents entering closed loop mode. For example, some particular cases might prevent the power management system 20 to converge to a set of calculated values (expected attenuation, expected optical power, etc.). The power management system 20 would then not be able to transmit the needed information to the VOA 34 to operate in closed loop mode.

There may be a hardware or software failure that prevents the power management system 20 from obtaining power management information such as expected optical power, expected attenuation, number of channels, etc. This information may be provided from the NMS 50 and a hardware or software defect prevents this information from being communicated to the power management system 20 in each network element 12. The power management system 20 cannot operate in closed loop mode without having information defining the required attenuation, gain, etc.

As described above, the invention may be embodied in the form of computer program code containing instructions embodied in tangible media, such as floppy diskettes, CD-ROMs, hard drives, or any other computer-readable storage medium, wherein, when the computer program code is loaded into and executed by the NMS, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Embodiments of the invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for monitoring a power control loop in an optical communication network, the method comprising:
   obtaining power management information from a network element at a network management system in the optical communication network, the power management information comprising whether the network element power control loop is operating in open loop mode or closed loop mode;
   obtaining network type from the network element, wherein said network type comprises one of a BLSR, UPSR, Linear ADM, Point to Point, and mesh;
   selecting power management rules in response to whether the network element power control loop is operating in open loop mode or closed loop mode and in response to said network type;
   applying the power management rules to the power management information; and
   detecting a valid or invalid power control loop in response to said applying, wherein said detecting step is performed differently responsive to the network type actually present;
   wherein said power management information identifies a component in the network element;
   wherein said selecting the power management rules is dependent on the component; and
   wherein the component is identified as a first type of variable optical attenuator having a first response speed or a second type of variable optical attenuator having a second response speed, wherein the first response speed and the second response speed comprise a relatively fast response speed and a relatively slow response speed.

2. The method of claim 1 further comprising:
   displaying power control loop mode and status.

3. The method of claim 1 further comprising:
   sending a corrective command to the network element if an invalid power control loop is detected.

4. The method of claim 1 further comprising:
   notifying a technician if an invalid power control loop is detected.

5. The method of claim 1 further comprising:
   detecting whether expected power at the network element is greater than a measurement threshold; and
   determining that open loop mode is valid if the expected power is greater than the measurement threshold.

6. An optical communication network comprising:
   a network element implementing a power control loop, said network element including a memory device including power management information, the power management information comprising whether the network element power control loop is operating in open loop mode or closed loop mode and the power management information comprising a network type, wherein said network type comprises one of a BLSR, UPSR, Linear ADM, Point to Point, and mesh;

a network management system in communication with said network element, said network management system obtaining the power management information;

said network management system selecting power management rules in response to whether the network element power control loop is operating in open loop mode or closed loop mode and in response to said network type;

said network management system applying the power management rules to the power management information; and said network management system detecting a valid or invalid power control loop in response to applying the power management rules, wherein said network management system detects differently responsive to the network type actually present;

wherein the power management information identifies a component in said network element;

wherein said network management system selects the power management rules in response to said component; and wherein said component is identified as a first type of variable optical attenuator having a first response speed or a second type of variable optical attenuator having a second response speed, wherein the first response speed and the second response speed comprise a relatively fast response speed and a relatively slow response speed.

7. The optical communication network of claim 6 wherein:

said network management system displays power control loop mode and status.

8. The optical communication network of claim 6 wherein:

said network management system sends a corrective command to said network element if an invalid power control loop is detected.

9. The optical communication network of claim 6 wherein:

said network management system notifies a technician if an invalid power control loop is detected.

10. The optical communication network of claim 6 wherein:

said network management system detects whether expected power at said network element is greater than a measurement threshold; and said network management system determines that open loop mode is valid if the expected power is greater than the measurement threshold.

11. A storage medium encoded with machine-readable computer program code for monitoring a power control loop in an optical communication network, the storage medium including instructions for causing a network management system to implement a method comprising:

obtaining power management information from a network element at the network management system in the optical communication network, the power management information comprising whether the network element power control loop is operating in open loop mode or closed loop mode;

obtaining network type from the network element, wherein said network type comprises one of a BLSR, UPSR, Linear ADM, Point to Point, and mesh;

selecting power management rules in response to whether the network element power control loop is operating in open loop mode or closed loop mode and in response to said network type;

applying the power management rules to the power management information; and detecting a valid or invalid power control loop in response to said applying, wherein said detecting step is performed differently responsive to the network type actually present;

wherein said power management information identifies a component in the network element;

wherein said selecting the power management rules is dependent on the component; and wherein the component is identified as a first type of variable optical attenuator having a first response speed or a second type of variable optical attenuator having a second response speed, wherein the first response speed and the second response speed comprise a relatively fast response speed and a relatively slow response speed.

* * * * *